United States Patent

Ueda et al.

Patent Number: 5,512,373
Date of Patent: Apr. 30, 1996

[54] MAGNETIC RECORDING MEDIUM

[75] Inventors: Kunihiro Ueda, Saku; Koji Kobayashi; Mitsuru Takai, both of Miyota; Masashi Higo, Saku, all of Japan

[73] Assignee: TDK Corporation, Tokyo, Japan

[21] Appl. No.: 208,756

[22] Filed: Mar. 9, 1994

[30] Foreign Application Priority Data

Mar. 9, 1993 [JP] Japan .................................. 5-072806

[51] Int. Cl.$^6$ ........................... B32B 27/00; G11B 5/66
[52] U.S. Cl. ................ 428/421; 428/422; 428/694 T; 428/694 TP; 428/694 TF; 428/694 BF; 428/695; 428/900; 428/704
[58] Field of Search .................. 428/694 T, 694 TP, 428/694 TF, 694 BF, 695, 800, 421, 422, 704

[56] References Cited

U.S. PATENT DOCUMENTS

| | | | |
|---|---|---|---|
| 4,786,544 | 11/1988 | Saito | 428/143 |
| 4,794,035 | 12/1988 | Ishihara | 428/219 |
| 5,091,249 | 2/1992 | Nishikawe | 428/336 |
| 5,128,216 | 7/1992 | Ng | 428/695 |
| 5,137,784 | 8/1992 | Suzuki | 428/408 |
| 5,188,747 | 2/1993 | Kai | 252/54 |
| 5,268,227 | 12/1993 | Nishikawe | 428/336 |
| 5,374,480 | 12/1994 | Nishikawe | 428/336 |

FOREIGN PATENT DOCUMENTS

| | | |
|---|---|---|
| 0467289 | 1/1992 | European Pat. Off. . |
| 56-87236 | 7/1981 | Japan . |
| 60-10368 | 3/1985 | Japan . |
| 4-30084 | 5/1992 | Japan . |
| 5-12656 | 1/1993 | Japan . |
| 9211631 | 7/1992 | WIPO . |

OTHER PUBLICATIONS

Patent Abstracts of Japan, vol. 17, No. 281 (P–1548) May 31, 1993 and JP–A–05 012 656 (Konica Corporation) Jan. 22, 1993.

European Search Report for Application No. EP 94 30 1678, date 17 May 1994.

*Primary Examiner*—Leszek Kiliman
*Attorney, Agent, or Firm*—Panitch Schwarze Jacobs & Nadel

[57] ABSTRACT

The problem of rusting relating to a magnetic recording medium composed of a non-magnetic base and a magnetic recording layer of a ferromagnetic metal layer formed thereon is overcome by a magnetic recording medium comprising a non-magnetic support, a ferromagnetic metal thin film as a magnetic recording layer and a lubricating layer, wherein the lubricating layer contains a mixture of a first lubricant having a polar perfluoro radial and a second lubricant expressed by the following formula:

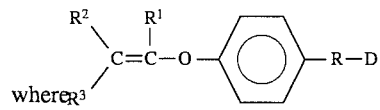

where

R is a divalent radical having 2 or fewer carbons atoms;

D is a polar radical selected from phosphorus-containing radical, hydroxyl, carboxyl and esterified carboxyl;

$R^1$ is selected from F, $CF_3$ and $C_2F_5$; and $R^2$ and $R_3$ are selected from F, $CF_3$ and $C_2F_5$, $CF(CF_3)_2$ and $C(CF_3)_3$.

6 Claims, No Drawings

MAGNETIC RECORDING MEDIUM

FIELD OF THE INVENTION

The present invention relates to a magnetic recording medium composed of a non-magnetic support having a ferromagnetic metal thin film thereon and, more particularly relates to such a magnetic recording medium having a lubricating layer on the ferromagnetic metal thin film.

PRIOR ART

Techniques relating to a magnetic recording medium having a ferromagnetic metal thin film as a magnetic recording layer such as Co—Ni, Co—Cr or other materials have been commercially utilized and extensively studied in the art for video recording, digital recording or other high density recording, or for making recording and reproducing devices compact and/or for a high performance.

In a magnetic recording medium which uses a ferromagnetic metal thin film as a magnetic recording layer, the metal thin film is usually directly contacted with a magnetic head and accordingly is relatively easily worn and gradually results in a poor running property. To overcome this problem, provision of a lubricating layer was proposed by Japanese Patent Application Kokoku Nos. 4-30084 and Japanese Patent Application Kokai Nos. 56-87236 and 5-12656. However, it is revealed that the lubricating layers proposed by these publications are not sufficient from the standpoint of anti-rust property and still reproduction property. Particularly, lubricants disclosed in Kokoku No. 4-30084 and Kokai Nos. 56-87236 were proved totally ineffective with respect to the anti-rust property and that disclosed in Kokai No 5-12656 is too repellant to apply on the ferromagnetic metal thin film.

The problem to be solved by the invention

As mentioned above, as ferromagnetic metal layers lack a sufficient lubricating property, it has been a practice to apply a lubricant on the surface of the ferromagnetic metal layers and accordingly a good lubricating property can be obtained. However, the prior art lubricating layer is not sufficient from the aspect of anti-rust property as well as anti-wear running property such as still reproduction property.

Accordingly, a principal object of the present invention is to overcome the problem of rusting relating to a magnetic recording medium composed of a non-magnetic base and a magnetic recording layer consisting essentially of a ferromagnetic metal layer formed thereon.

In addition, the present invention is to provide a magnetic recording medium having a good running property and a long still time.

BRIEF SUMMARY OF THE INVENTION

The problems are overcome by a magnetic recording medium according to the present invention, which comprises a non-magnetic support, a ferromagnetic metal thin film as a magnetic recording layer and a lubricating layer thereon, characterized in that the lubricating layer consists essentially of a mixture of a first lubricant having a chemical formula expressed by following formula (1):

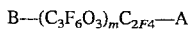

where

A is selected from the group of carboxyl radical, carboxyl radical esterified with one selected from $CH_3$, $C_2H_5$, $CF_3$ and $C_2F_5$, B is selected from the group F, $CF_3$ and $C_2F_5$, and m is integer from 5 to 30.

and a second lubricant expressed by following formula(2):

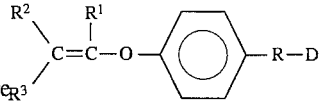

where

R is a divalent radical having carbon atoms of 2 or less selected from the group of alkylene, alkenylene, alkynylene, fluorinated alkyl and florinated alkenylene;

D is a polar radical selected from the group of $-OPO(OR^4)_2$, $-OPO(OR^4)_2$, $-OPH(OR_4)$, $-PO(OR^4)_2$, $-PO(OR^4)_2$, $-PH(OR^4)$ ($R^4$ in each phosphorus containing radical is selected from H, $CH_3$, $C_2H_5$, $CF_3$ and $C_2F_5$), hydroxyl radical, carboxyl radical and carboxyl radical esterified with $CH_3$, $C_2H_5$, $CF_3$ and $C_2F_5$, $R_1$ is selected from the group of F, $CF_3$ and $C_2F_5$; and $R_2$, $R_3$ are selected from the group of F, $CF_3$, $C_2F_5$, $CF(CF_3)_2$ and $C(CF_3)_3$.

The first lubricant and the second lubricant are used in an amount of 0.1–1 wt % dissolved or dispersed in 100% of a solvent, and applied to the surface of the ferromagnetic metal thin film with a gravure, die-nozzle or reverse coating method. In the case of die-nozzle method, the concentration, supply rate, and the tape running speed are controlled to give a desired thickness. As the film thickness, about 20 Å–40 Å is appropriate and the value can be controlled by controlling the texture of the gravure roll, gap size and feed rate.

As a solvent, fluorinated solvents such as E-90( Tradename, sold by Motecatini s.p.A.) which is outside the Freon control is used to dissolve the lubricants and to apply them on the magnetic layer. It is essential to apply them as a mixture.

As described in Japanese Patent Application Kokai No. 5-12656, it is not possible to properly apply them on the magnetic layer if one tries to apply them subsequently because the first applied lubricant is hydrophobic and rejects the polar groups of the second applied lubricant, resulting in an inferior result. Accordingly, it is essential to apply them as a mixture.

This can be explained as follows. That is, the molecules of the first applied lubricant is attached by their hydrophilic groups to the ferromagnetic metal thin film and the non-polar groups of the molecules are on the side away form the magnetic layer. Then, the hydrophobic groups of the molecules of the secondly applied layer comes on the side of the magnetic layer and their hydrophilic groups are positioned away from the magnetic layer. Thus, the contact angle is decreased to a great extent even though the material is fluorinated and the polar groups are positioned on the side away from the magnetic layer. Accordingly, it is essential to apply them as a mixture.

The weight ratio of the first lubricant to the second lubricant is between 1:0.05 and 1:1.0, and preferably between 1:0.3 and 1:0.5. If this amount is less than 0.05, the anti-rust effect is not sufficient and if it exceeds 1.0 the running property is debased.

The first lubricant mainly gives a lubricating effect and the second one achieves an anti-rust effect as well as the lubricating effect.

50 wt % or less of a third lubricant based on the sum of the first and the second lubricants, selected from the group of non-polar perfluoropolyether having a radical expressed by $RPO_4H_2$ straight-chain alkyl radical having 8-20 carbon atoms or its fluorinated radical), straight-chain perfluoroearboxylic acid or its ester esterified with $R_1$ ($R_1$ is straight-chain alkyl radical having 5 or less carbon atoms or its fluorinated alkyl) may be added.

The ferromagnetic metal thin film is formed from a metal or alloy selected from the group of Co and Co-containing alloys such as Co—O, Co—Ni, Co—Ni—O, Co—Ni—Cr, Co—Ta—Cr, Co—Pt—Cr, Co—Fe, Co—Cr and Fe—Ni, depending on the applications.

The ferromagnetic thin metal film may have a single layer or multi-layer structure and may include an undercoat layer between the non-magnetic support and the magnetic recording layer.

To attain a stable running, a backcoat layer may be formed on the side opposite to the ferromagnetic metal thin film layer.

The non-magnetic support is made of a plastic material selected from polyethylenetelephtahalate(PET), polyethylenenaphthalate(PEN), aramid, polyimide, polypheylenesulfate(PPS) or the like or an inorganic material selected from aluminum, glass or the like.

As a method for forming a ferromagnetic metal thin film on a non-magnetic support, electron beam evaporation, ion-plating, sputtering or other conventional methods may be suitably employed. In the working examples of the present invention, the electron beam evaporation method was adopted. A Co—Ni alloy in a crucible was placed in a vacuum chamber and the alloy was molten by irradiation with an high energy electron beam and the vaporized Co—Ni alloy was deposited on a continuous length of a PET film travelling around a rotating drum. According to the present invention, the running property is stabilized by the first lubricant and the anti-rust property is attained with the use of the second-lubricant which solve, in combination, the problems of the conventional magnetic recording medium which was coated with a liquid lubricant. Moreover, by the combination of the first and second lubricants, the still life is also increased. By adding the third lubricant, the running durability is improved but if it is in excess the effects by the first and the second lubricants are hindered and the storage life as well as the lubrication are reduced.

EXPLANATION OF PREFERRED EMBODIMENTS

Example 1

A ferromagnetic film of Co80-Ni20(weight ratio) alloy having a thickness of 2,000 Å was deposited on a PET film having a thickness of 10 μm with the electron beam evaporation method. The ferromagnetic layer consisted of 2 layers each having a thickness of 1,000 Å.

Next, as a first lubricant, a polar perfluoropolyether of the above-mentioned chemical formula (1) wherein A, B, and m are as listed in Table 1 was used and a second lubricant of the above formula (2) wherein the $R_1,CF_3, R_2, R_3$, D and R are as listed in the Table 2 was used.

The ratio of first lubricant to second lubricant was 1:X as indicated in Table 3. As to the concentration of the lubricants to the total amount of the solvent was 0.5 wt % and they were thoroughly mixed together and applied on the ferromagnetic alloy thin film. The solvent used was fluorinated E-90(Tradename, manufactured by Montecatini s.p.A.). The lubricants were applied in a thickness of about 30 Å by selecting the gravure roll.

The evaluation of the resulting magnetic recording tapes was done regarding the initial friction, long-use friction, anti-rust property, still property and head clogging. The initial friction is the coefficient of friction measured with a pin evaluation machine having a contacting angle of 180 degrees by passing once the tape through the machine. The long-use friction is the coefficient of friction measured with the same machine after passing the magnetic tape 200 times. The head clogging is the number of passage before head clogging is observed.

The anti-rust property is the reduction in remnant magnetic flux of Bm(%) after storage of one week in an atmosphere of 60° C. and 90% RH. The still property is the time period required for reduction in the output by −5 db in comparison with the initial output.

As seen from Tables 3 and 4, it is clear that the present invention achieves a superior running property, running durability, still property and anti-rust property in the case of a magnetic recording medium having a ferromagnetic metal or alloy thin film as a magnetic recording layer.

TABLE 1

| First lubricant | A | B | m |
|---|---|---|---|
| 1 | OH | F | 25 |
| 2 | OH | $CF_3$ | 25 |
| 3 | OH | $C_2F_5$ | 25 |
| 4 | COOH | F | 25 |
| 5 | COOH | $CF_3$ | 25 |
| 6 | COOH | $C_2F_5$ | 25 |
| 7 | $COOCH_3$ | F | 25 |
| 8 | $COOCH_3$ | $CF_3$ | 25 |
| 9 | $COOCH_3$ | $C_2F_5$ | 25 |
| 10 | $COOC_2H_5$ | F | 25 |
| 11 | $COOCF_3$ | F | 25 |
| 12 | $COOC_2F_5$ | F | 25 |
| 13 | OH | F | 5 |
| 14 | OH | F | 10 |
| 15 | OH | F | 20 |
| 16 | OH | F | 30 |
| 17 | OH | F | 40 |
| 18 | OH | F | 50 |
| 19 | OH | F | 60 |
| 20 | OH | F | 2 |
| 21 | OH | OH | 25 |
| 22 | $NH_3$ | F | 25 |
| 23 | $COOCH_3$ | $COOCH_3$ | 25 |

TABLE 2

| Second Lubricant | $R^1$ | $R^2, R^3$ | D | R |
|---|---|---|---|---|
| 1 | $CF_3$ | $CF(CF_3)_2$ | $PO(OH)_2$ | $CH_2$ |
| 2 | F | $CF(CF_3)_2$ | $PO(OH)_2$ | $CH_2$ |
| 3 | $C_2F_5$ | $CF(CF_3)_2$ | $PO(OH)_2$ | $CH_2$ |
| 4 | $CF_3$ | $C(CF_3)_3$ | $PO(OH)_2$ | $CH_2$ |
| 5 | F | $C(CF_3)_3$ | $PO(OH)_2$ | $CH_2$ |
| 6 | $C_2F_5$ | $C(CF_3)_3$ | $PO(OH)_2$ | $CH_2$ |
| 7 | $CF_3$ | $C(CF_3)_3$ | $PO(OH)_2$ | $CH_2$ |
| 8 | F | $C(CF_3)_3$ | $PO(OH)_2$ | $CH_2$ |
| 9 | $C_2F_5$ | $C(CF_3)_3$ | $PH(OH)$ | $CH_2$ |
| 10 | $CF_3$ | $C(CF_3)_3$ | $PH(OH)$ | $CH_2$ |
| 11 | F | $C(CF_3)_3$ | $PH(OH)$ | $CH_2$ |
| 12 | $C_2F_5$ | $C(CF_3)_3$ | $PH(OH)$ | $CH_2$ |
| 13 | F | $C(CF_3)_3$ | $PO(OCH_3)_2$ | $CH_2$ |
| 14 | F | $C(CF_3)_3$ | $PO(OC_2H_5)_2$ | $CH_2$ |
| 15 | F | $C(CF_3)_3$ | $PO(OCF_3)_2$ | $CH_2$ |
| 16 | F | $C(CF_3)_3$ | $PO(OC_2F_5)_2$ | $CH_2$ |
| 17 | F | $C(CF_3)_3$ | $PO(OCH_3)_2$ | $CH_2$ |
| 18 | F | $C(CF_3)_3$ | $PO(OCH_3)_2$ | $CH_2$ |
| 19 | F | $C(CF_3)_3$ | OH | $CH_2$ |
| 20 | F | $C(CF_3)_3$ | COOH | $CH_2$ |

TABLE 2-continued

| Second Lubricant | $R^1$ | $R^2, R^3$ | D | R |
|---|---|---|---|---|
| 21 | F | $C(CF_3)_3$ | $COOCH_3$ | $CH_2$ |
| 22 | F | $C(CF_3)_3$ | $COOC_2H_5$ | $CH_2$ |
| 23 | F | F | $P(OH)_2$ | $CH_2$ |
| 24 | F | $CF_3$ | $P(OH)_2$ | $CH_2$ |
| 25 | F | $C_2F_5$ | $P(OH)_2$ | $CH_2$ |
| 26 | F | $C(CF_3)_3$ | $P(OH)_2$ | $CF_2$ |
| 27 | F | $C(CF_3)_3$ | $P(OH)_2$ | $C_2H_2$ |
| 28 | F | $C(CF_3)_3$ | $P(OH)_2$ | $C_2$ |
| 29 | F | $C(CF_3)_3$ | $P(OH)_2$ | $C_2F_2$ |
| 30 | $CF_3$ | $C(CF_3)_3$ | 1* | $CH_2$ |
| 31 | $CF_3$ | $C(CF_3)_3$ | 2* | $CH_2$ |
| 32 | $CF_3$ | $C(CF_3)_3$ | 3* | $CH_2$ |

1*: $OPO(OH)_2$, 2*: $OP(OH)_2$, 3*: $OPH(OH)$

TABLE 3

| Run | Examples | First lubr. | Second lubr. | Ratio 1:X | Application | Int. fr. μ | Long fr. μ | ΔBm % | Still min. | Clogg times |
|---|---|---|---|---|---|---|---|---|---|---|
| 1 | Comp. | — | — | — | — | 0.55 | * | 25 | 1 | 25 |
| 2 | Comp. | 1 | — | — | — | 0.23 | 0.35 | 25 | 20 | 5 |
| 3 | Comp. | — | 1 | — | — | 0.35 | * | 7 | 5 | 20 |
| 4 | Ex. | 1 | 1 | 0.05 | Mix. | 0.22 | 0.30 | 7 | 60 | 5 |
| 5 | Ex. | 1 | 1 | 0.1 | Mix. | 0.23 | 0.30 | 10 | 60 | 5 |
| 6 | Ex. | 1 | 1 | 0.3 | Mix | 0.23 | 0.30 | 9 | 50 | 5 |
| 7 | Ex. | 1 | 1 | 0.5 | Mix | 0.24 | 0.30 | 8 | 50 | 5 |
| 8 | Ex. | 1 | 1 | 1.0 | Mix | 0.24 | 0.32 | 8 | 50 | 5 |
| 9 | Ex. | 1 | 1 | 1.5 | Mix. | 0.25 | 0.32 | 8 | 50 | 7 |
| 10 | Comp. | 1 | 1 | 0.02 | Mix. | 0.23 | 0.35 | 25 | 20 | 7 |
| 11 | Comp. | 1 | 1 | 0.5 | Unmix. | 0.35 | * | 8 | 5 | 20 |
| 12 | Ex. | 1 | 2 | 0.5 | Mix. | 0.23 | 0.31 | 8 | 50 | 5 |
| 13 | Ex. | 1 | 3 | 0.5 | Mix. | 0.24 | 0.31 | 8 | 50 | 5 |
| 14 | Ex. | 1 | 4 | 0.5 | Mix. | 0.24 | 0.31 | 6 | 50 | 5 |
| 15 | Ex. | 1 | 5 | 0.5 | Mix. | 0.24 | 0.31 | 6 | 50 | 5 |
| 16 | Ex. | 1 | 6 | 0.5 | Mix. | 0.24 | 0.31 | 6 | 50 | 5 |
| 17 | Ex. | 1 | 7 | 0.5 | Mix. | 0.23 | 0.31 | 5 | 50 | 4 |
| 18 | Ex. | 1 | 8 | 0.5 | Mix. | 0.22 | 0.30 | 5 | 50 | 4 |
| 19 | Ex. | 1 | 9 | 0.5 | Mix. | 0.23 | 0.31 | 5 | 50 | 4 |
| 20 | Ex. | 1 | 10 | 0.5 | Mix. | 0.24 | 0.31 | 5 | 50 | 4 |
| 21 | Ex. | 1 | 11 | 0.5 | Mix. | 0.24 | 0.31 | 5 | 50 | 4 |
| 22 | Ex. | 1 | 12 | 0.5 | Mix. | 0.24 | 0.31 | 5 | 50 | 4 |
| 23 | Ex. | 1 | 13 | 0.5 | Mix. | 0.24 | 0.31 | 7 | 50 | 5 |
| 24 | Ex. | 1 | 14 | 0.5 | Mix. | 0.24 | 0.31 | 7 | 50 | 5 |
| 25 | Ex. | 1 | 15 | 0.5 | Mix. | 0.24 | 0.31 | 7 | 50 | 5 |
| 26 | Ex. | 1 | 16 | 0.5 | Mix. | 0.24 | 0.31 | 7 | 60 | 5 |
| 27 | Ex. | 1 | 17 | 0.5 | Mix. | 0.24 | 0.31 | 5 | 50 | 5 |
| 28 | Ex. | 1 | 18 | 0.5 | Mix. | 0.24 | 0.31 | 5 | 50 | 5 |
| 29 | Ex. | 1 | 19 | 0.5 | Mix. | 0.24 | 0.31 | 9 | 50 | 5 |
| 30 | Ex. | 1 | 20 | 0.5 | Mix. | 0.24 | 0.31 | 7 | 50 | 5 |
| 31 | Ex. | 1 | 21 | 0.5 | Mix. | 0.24 | 0.31 | 8 | 50 | 5 |
| 32 | Ex. | 1 | 22 | 0.5 | Mix. | 0.24 | 0.31 | 8 | 50 | 5 |
| 33 | Ex. | 1 | 23 | 0.5 | Mix. | 0.25 | 0.35 | 10 | 45 | 7 |
| 34 | Ex. | 1 | 24 | 0.5 | Mix. | 0.25 | 0.35 | 9 | 45 | 6 |
| 35 | Ex. | 1 | 25 | 0.5 | Mix. | 0.25 | 0.34 | 9 | 45 | 6 |
| 36 | Ex. | 1 | 26 | 0.5 | Mix. | 0.24 | 0.31 | 7 | 50 | 5 |
| 37 | Ex. | 1 | 27 | 0.5 | Mix. | 0.24 | 0.31 | 8 | 50 | 5 |
| 38 | Ex. | 1 | 28 | 0.5 | Mix. | 0.24 | 0.31 | 8 | 50 | 5 |
| 39 | Ex. | 1 | 29 | 0.5 | Mix. | 0.24 | 0.31 | 8 | 50 | 5 |
| 40 | Ex. | 2 | 1 | 0.5 | Mix. | 0.22 | 0.30 | 8 | 60 | 5 |
| 41 | Ex. | 3 | 1 | 0.5 | Mix. | 0.22 | 0.30 | 8 | 60 | 5 |
| 42 | Ex. | 4 | 1 | 0.5 | Mix. | 0.25 | 0.29 | 8 | 60 | 5 |
| 43 | Ex. | 5 | 1 | 0.5 | Mix. | 0.25 | 0.29 | 8 | 65 | 5 |
| 44 | Ex. | 6 | 1 | 0.5 | Mix. | 0.25 | 0.29 | 8 | 65 | 5 |
| 45 | Ex. | 7 | 1 | 0.5 | Mix. | 0.23 | 0.30 | 8 | 50 | 5 |
| 46 | Ex. | 8 | 1 | 0.5 | Mix. | 0.22 | 0.32 | 8 | 50 | 5 |
| 47 | Ex. | 9 | 1 | 0.5 | Mix. | 0.22 | 0.32 | 8 | 50 | 5 |
| 48 | Ex. | 10 | 1 | 0.5 | Mix. | 0.23 | 0.32 | 8 | 50 | 5 |
| 49 | Ex. | 11 | 1 | 0.5 | Mix. | 0.23 | 0.32 | 8 | 50 | 5 |
| 50 | Ex. | 12 | 1 | 0.5 | Mix. | 0.24 | 0.31 | 8 | 50 | 5 |
| 51 | Ex. | 13 | 1 | 0.5 | Mix. | 0.23 | 0.32 | 8 | 50 | 5 |
| 52 | Ex. | 14 | 1 | 0.5 | Mix. | 0.23 | 0.32 | 8 | 50 | 5 |
| 53 | Ex. | 15 | 1 | 0.5 | Mix. | 0.23 | 0.32 | 8 | 50 | 5 |
| 54 | Ex. | 16 | 1 | 0.5 | Mix. | 0.23 | 0.32 | 8 | 50 | 5 |
| 55 | Ex. | 17 | 1 | 0.5 | Mix. | 0.23 | 0.32 | 8 | 50 | 5 |
| 56 | Ex. | 18 | 1 | 0.5 | Mix. | 0.23 | 0.32 | 8 | 50 | 5 |
| 57 | Ex. | 19 | 1 | 0.5 | Mix. | 0.23 | 0.32 | 8 | 50 | 5 |
| 58 | Ex. | 20 | 1 | 0.5 | Mix. | 0.23 | 0.32 | 8 | 50 | 5 |
| 59 | Comp. | 21 | 1 | 0.5 | Mix. | 0.25 | 0.35 | 8 | 20 | 5 |
| 60 | Comp. | 22 | 1 | 0.5 | Mix. | 0.25 | 0.35 | 8 | 15 | 5 |
| 61 | Comp. | 23 | 1 | 0.5 | Mix. | 0.25 | 0.35 | 8 | 15 | 5 |

TABLE 3-continued

| Run | Examples | First lubr. | Second lubr. | Ratio 1:X | Application | Int. fr. μ | Long fr. μ | ΔBm % | Still min. | Clogg times |
|---|---|---|---|---|---|---|---|---|---|---|
| A1 | Ex. | 1 | 30 | 0.5 | Mix. | 0.24 | 0.35 | 8 | 15 | 5 |
| A2 | Ex. | 1 | 31 | 0.5 | Mix. | 0.24 | 0.31 | 8 | 60 | 5 |
| A3 | Ex. | 1 | 32 | 0.5 | Mix. | 0.25 | 0.31 | 8 | 60 | 5 |

*Measurement was not possible

TABLE 4

| Run | Examples | 1st/2nd | 1st/2nd ratio | 3rd/(1st + 3rd) ratio | Int. fr. μ | Long fr. μ | ΔBm % | Still (min) | Clogg times |
|---|---|---|---|---|---|---|---|---|---|
| | | | Third lubricant: n-C8F17COOH | | | | | | |
| 62 | Ex. | 1/1 | 0.5 | 0.5 | 0.23 | 0.32 | 8 | 60 | 0 |
| 63 | Ex. | 1/1 | 0.5 | 0.4 | 0.23 | 0.32 | 8 | 60 | 0 |
| 64 | Ex. | 1/1 | 0.5 | 0.3 | 0.23 | 0.32 | 8 | 60 | 1 |
| 65 | Ex. | 1/1 | 0.5 | 0.2 | 0.24 | 0.32 | 8 | 60 | 1 |
| 66 | Ex. | 1/1 | 0.5 | 0.1 | 0.24 | 0.32 | 8 | 60 | 1 |
| 67 | Comp. | 1/1 | 0.5 | 0.6 | 0.24 | 0.36 | 12 | 40 | 1 |
| | | | Third lubricant: non-polar perfluoropolyether A of the first lubricant: F | | | | | | |
| 68 | Ex. | 1/1 | 0.5 | 0.5 | 0.23 | 0.32 | 8 | 60 | 0 |
| 69 | Ex. | 1/1 | 0.5 | 0.4 | 0.23 | 0.32 | 8 | 60 | 0 |
| 70 | Ex. | 1/1 | 0.5 | 0.3 | 0.23 | 0.32 | 8 | 60 | 1 |
| 71 | Ex. | 1/1 | 0.5 | 0.2 | 0.24 | 0.32 | 8 | 60 | 1 |
| 72 | Ex. | 1/1 | 0.5 | 0.1 | 0.24 | 0.32 | 8 | 60 | 1 |
| 73 | Comp. | 1/1 | 0.5 | 0.6 | 0.24 | 0.40 | 10 | 45 | 0 |
| | | | Phosphate of Lauric acid | | | | | | |
| 74 | Ex. | 1/1 | 0.5 | 0.5 | 0.23 | 0.32 | 8 | 100 | 0 |
| 75 | Ex. | 1/1 | 0.5 | 0.4 | 0.23 | 0.32 | 8 | 90 | 0 |
| 76 | Ex. | 1/1 | 0.5 | 0.3 | 0.23 | 0.32 | 8 | 80 | 1 |
| 77 | Ex. | 1/1 | 0.5 | 0.2 | 0.24 | 0.32 | 8 | 75 | 1 |
| 78 | Ex. | 1/1 | 0.5 | 0.1 | 0.24 | 0.32 | 8 | 70 | 1 |
| 79 | Comp. | 1/1 | 0.5 | 0.6 | 0.24 | 0.36 | 9 | 35 | 1 |

What is claimed is:

1. A magnetic recording medium comprising a nonmagnetic support, a magnetic recording layer comprising a ferromagnetic metal thin film formed on the support and a lubricating layer on the ferromagnetic metal thin film wherein the lubricating layer consists essentially of a mixture of a first lubricant expressed by the following formula:

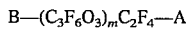
B—(C$_3$F$_6$O$_3$)$_m$C$_2$F$_4$—A where

A is selected from the group consisting of hydroxyl radical, carboxyl radical and carboxyl radical esterified with a radical selected from the group consisting of CH$_3$, C$_2$H$_5$ CF$_3$ and C$_2$F$_5$, B is selected from the group consisting of F, CF$_3$ and C$_2$F$_5$, and m is an integer from 5 to 30; and a second lubricant expressed by the following formula:

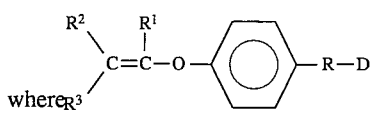

where R$^3$

R is a divalent radical having two or fewer carbon atoms selected from the group consisting of alkylene, alkenylene, alkynylene, fluorinated alkyl and fluorinated alkenylene;

D is a polar radical selected from the group consisting of —OPO(OR$^4$)$_2$, —OP(OR$^4$)$_2$, OPH(OR$^4$)$_2$, —PO(OR$^4$)$_2$, — P(OR$^4$)$_2$, —PH(OR$^4$), hydroxyl radical, carboxyl radical, and carboxyl radical esterified, with a member of the group consisting of CH$_3$, C$_2$H$_5$, CF$_3$ and C$_2$F$_5$, wherein R$^4$ in each phosphorus-containing radical is selected from the group consisting of H, CH$_3$, C$_2$H$_5$, CF$_3$ and C$_2$F$_5$, R$^1$ is selected from the group consisting of F, CF$_3$ and C$_2$F$_5$; and R$^2$, R$^3$ are selected from the group consisting of F, CF$_3$, C$_2$F$_5$, CF(CF$_3$)$_2$ and C(CF$_3$)$_3$, where the weight ratio of the first lubricant to the second lubricant is between 1:0.02 and 1:1.5.

2. A magnetic recording medium according to claim 1 wherein the weight ration of the first lubricant to the second lubricant is between 1.0:0.05 and 1.0:1:0.

3. A magnetic recording medium according to claim 1, wherein the weight ratio of the first lubricant to the second lubricant is between 1:0.05 and 1:1.0.

4. A magnetic recording medium according to claim 1, wherein the weight ratio of the first lubricant to the second lubricant is between 1:0.3 and 1:0.5.

5. A magnetic recording medium according to claim 1 wherein a third lubricant is further contained in the lubricating layer in a ratio of 50% or less based on total amount of the first and the second lubricants, said third lubricant is selected from the group consisting of non-polar perfluoropolyether having a radical expressed by RPO$_4$H$_2$, where R is straight-chain alkyl radical having 8–20 carbon atoms or its fluorinated radical, straight-chain perfluorocarboxylic acid or its ester esterified with R$_1$, where R$_1$ is straight-chain alkyl radical having 5 or less carbon atoms or its fluorinated alkyl.

6. A magnetic recording medium according to claim 2 wherein a third lubricant is further contained in the lubricating layer in a ratio of 50% or less based on total amount of the first and the second lubricants, said third lubricant is selected from the group consisting of non-polar perfluoropolyether having a radical expressed by $RPO_4H_2$, where R is straight-chain alkyl radical having 8–20 carbon atoms or its fluorinated radical, straight-chain perfluorocarboxylic acid or its ester esterified with $R_1$, where $R_1$ is straight-chain alkyl radical having 5 or less carbon atoms or its fluorinated alkyl.

* * * * *